S. L. SOPENOFF AND M. KATCHER.
ELECTRICAL OUTLET BOX.
APPLICATION FILED FEB. 24, 1920.
1,429,172.  Patented Sept. 12, 1922.
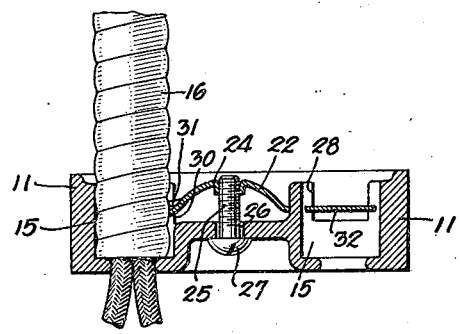
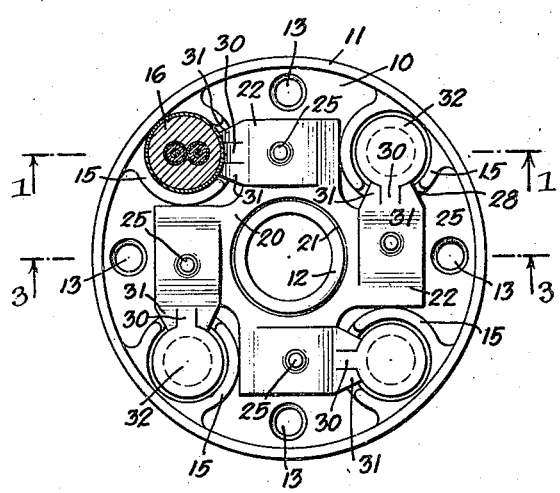
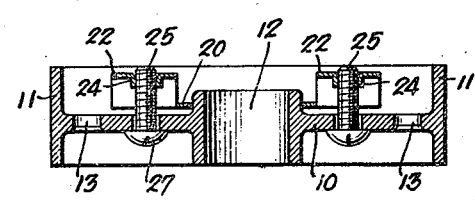
WITNESSES
Fred Diehl
INVENTORS
SAMUEL L. SOPENOFF
MORRIS KATCHER
BY
ATTORNEYS Patented Sept. 12, 1922.

1,429,172

UNITED STATES PATENT OFFICE.

SAMUEL L. SOPENOFF AND MORRIS KATCHER, OF BROOKLYN, NEW YORK.

ELECTRICAL OUTLET BOX.

Application filed February 24, 1920. Serial No. 360,749.

*To all whom it may concern:*

Be it known that we, SAMUEL L. SOPENOFF and MORRIS KATCHER, both citizens of the United States, and residents of the city of New York, borough of Brooklyn, in the county of Kings and State of New York, have invented a new and Improved Electrical Outlet Box, of which the following is a full, clear, and exact description.

The object of the invention is to provide a new and improved electrical outlet or junction box which is simple and durable in construction, cheap to manufacture and arranged to firmly clamp the conduits in position in the box.

Another object is to form the outlet box of very few parts which can be readily assembled thus reducing the cost of manufacture to a minimum.

Another object is to provide a single member for clamping the several conduits in place and support the several knock-out disks.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the improved electrical outlet box, the section being on the line 1—1 of Figure 2;

Figure 2 is a plan view of the same with the electrical conduit shown in section; and Figure 3 is a sectional side elevation of the same on the line 3—3 of Figure 2.

The body 10 of the electrical outlet box is in the form of a disk provided at its margin with an annular flange 11 and provided at its center with a central sleeve 12 for the passage of a gas pipe or similar fixture. The body 10 is provided with holes 13 for the passage of screws or other fastening devices to fasten the box to a ceiling or other support. The body 10 is provided adjacent the rim 11 with marginal sockets 15, preferably four in number, and each adapted to be engaged by an electrical conduit 16, as plainly indicated in Figures 1 and 2.

The outlet box is provided with a clamping plate 20, preferably of spring metal, and provided at the middle with an opening 21 through which extends the upper end of the sleeve 12 to hold the clamping plate 20 centered on the outlet box. The clamping plate 20 is provided with integral spring tongues 22, one for each socket 15, and each spring tongue is curved as shown in Figure 1 and provided at or near its middle with a threaded aperture 24 in which screws a screw 25 extending through an aperture 26 formed in the body 10 of the outlet box. The head 27 of the screw 25 abuts against the under side of the body 10. By the arrangement described the screws 25 serve to fasten the plate 20 in position on the body 10 of the outlet box and at the same time the screws 25 serve to place the spring tongues 22 under the desired compression. The free ends of the spring tongues 22 project through cutout portions 28 formed in the upper ends of the sockets 15, and the free end of each spring tongue 22 is provided with a central tooth 30 and side teeth 31. The tooth 30 terminates in a knock-out disk 32 extending into the corresponding socket 15. When it is desired to insert a conduit 16 into a socket then the corresponding knock-out disk 32 is broken off, the cleavage being at the end of the tooth 30, thus leaving the latter to function as a clamping means in conjunction with the teeth 31 to clampingly engage the armor or insulation of the conduit 16 inserted in said socket 15. In practice, the teeth 30 and 31 are bent in opposite directions to insure an exceedingly firm clamping contact of the free ends of a tongue 22 with the armor or insulation of the conduit 16.

From the foregoing it will be seen that when a conduit 16 is inserted in a socket 15 then the teeth 30 and 31 clampingly engage the armor or insulation of the conduit 16, and on turning a corresponding screw 25 the compression of the clamping tongue 22 can be increased to insure an exceedingly firm clamping action of the teeth 30 and 31 on the peripheral face of the armor or insulation of the conduit 16 by forcing the latter in firm contact with the wall of the socket 15 opposite the spring tongue 22.

It will further be noticed that but a single clamping member is provided and one which can be cheaply manufactured and readily fastened in position on the outlet box by the screws 25, which in addition serve to adjust the compression of the spring tongues 22.

Having thus described our invention, we claim as new and desire to secure by Letters Patent:—

1. An electric outlet box provided with a clamping plate having a plurality of integral curved spring tongues each provided at its free end with teeth extending in different directions, a knock-out disk extending integrally from one of the said teeth and adapted to be broken off, and adjustable means engaging the said spring tongues to fasten the clamping plate to the outlet box and to place the spring tongues under compression.

2. In an electrical outlet box having a plurality of conduit receiving sockets, a clamping plate attached to the box and having a plurality of integral curved spring tongues extending with their free ends into circumferential portions of the sockets to clampingly engage the conduits inserted into the sockets, and screws engaging the box and the spring tongues to fasten the plate in position on the box and to place the spring tongues under compression, each of the spring tongues having at its free end an integral knock-out disk extending into the socket and adapted to be broken.

3. In an electrical outlet box having a plurality of conduit receiving sockets, a clamping plate attached to the box and having a plurality of integral curved spring tongues extending with their free ends into circumferential portions of the sockets to clampingly engage the conduits inserted into the sockets, each of the tongues having its free end provided with teeth extending in opposite directions, and screws engaging the box and the spring tongues to fasten the plate in position on the box and to place the spring tongues under compression.

4. In an integral outlet box having a central sleeve and having a plurality of marginal conduit receiving sockets, a clamping plate having a central opening fitting onto the said sleeve and having a plurality of integral curved clamping members each provided with an integral knock-out disk extending into a corresponding socket, each of the said knock-out disks being adapted to be broken off to leave a clamping edge at the line of cleavage for clamping engagement with a conduit inserted in the corresponding socket, and fastening and tensioning means held on the box and engaging the said clamping members to fasten the clamping plate to the box and to place the clamping members under compression.

5. An electrical outlet box having a central sleeve and having a plurality of conduit receiving marginal sockets each having its top edge provided with a cut-out portion, and a clamping plate having a central aperture into which fits the said sleeve, the said clamping plate having a plurality of integral curved spring tongues, each extending with its free end through a cut-out portion of a corresponding socket to clampingly engage the conduit inserted in the said socket.

6. An electrical outlet box having a central sleeve and having a plurality of conduit receiving marginal sockets each having its top edge provided with a cut-out portion, a clamping plate having a central aperture into which fits the said sleeve, the said clamping plate having a plurality of integral curved spring tongues each extending with its free end through a cut-out portion of a corresponding socket to clampingly engage the conduit inserted in the said socket, and a screw screwing in each tongue and passing through the box to fasten the clamping plate to the box and to place the spring tongues under compression.

7. An electrical outlet box having a central sleeve and having a plurality of conduit receiving marginal sockets, each having its top edge provided with a cut-out portion, a clamping plate having a central aperture into which the said sleeve fits, the said clamping plate having a plurality of integral curved spring tongues each extending with its free end through a cut-out portion of a corresponding socket to clampingly engage the conduit inserted in the said socket, each spring tongue having its free end provided with teeth extending in opposite directions, a knock-out disk extending integrally from one of the teeth and fitting into the corresponding socket, and screws screwing in the spring tongues and passing through the said box to fasten the clamping plate to the box and to place the spring tongues under compression.

SAMUEL L. SOPENOFF.
MORRIS KATCHER.